(Model.)

W. P. PENN.
GRAIN DRILL.

No. 336,427. Patented Feb. 16, 1886.

Witnesses.
George Penn
Worden P. Penn Jr.
Bernice F. Mayer

Inventor.
Worden P. Penn

UNITED STATES PATENT OFFICE.

WORDEN P. PENN, OF ST. LOUIS, MISSOURI.

GRAIN-DRILL.

SPECIFICATION forming part of Letters Patent No. 336,427, dated February 16, 1886.

Application filed November 13, 1882. Renewed November 27, 1885. Serial No. 184,080. (Model.)

*To all whom it may concern:*

Be it known that I, WORDEN P. PENN, of St. Louis, in the county of St. Louis and State of Missouri, have invented certain new and useful Improvements in Grain-Drills, of which the following is a full, clear, and exact description, reference being had to the annexed drawings, making a part of this specification, in which—

Figure 1:
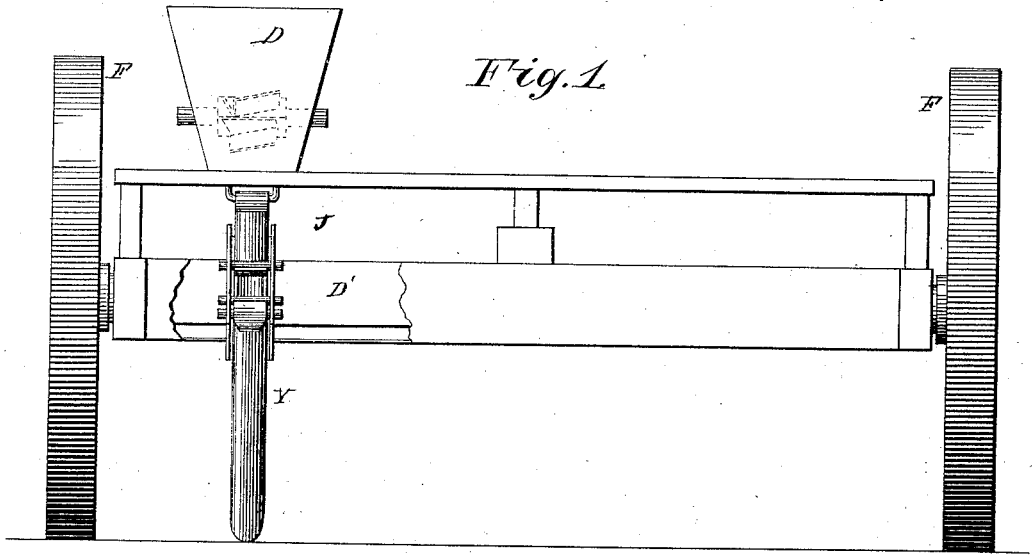
Figure 2:
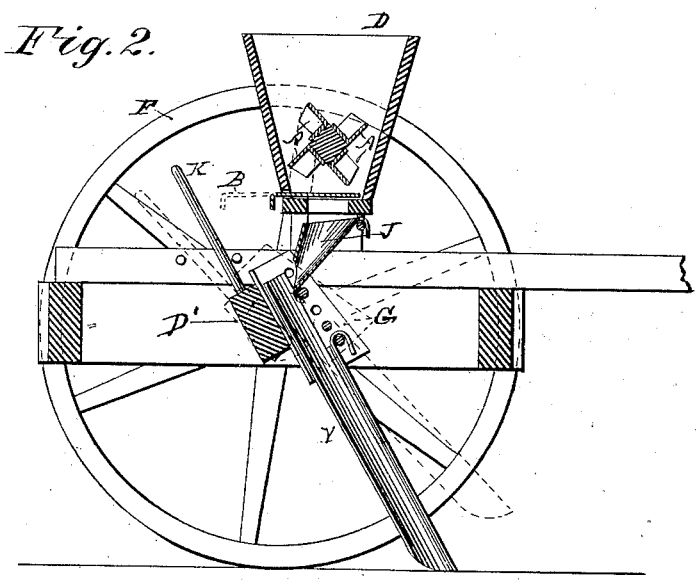

Figure 1 is a vertical front section of the machine. Fig. 2 is a vertical side section of the machine.

This invention relates to certain improvements in seeding-machines or grain-drills, hereinafter pointed out.

The feeders A cause a continuous flow of the grain through the seed-outlets in the bottom of the hopper. A series of the outlets are used in a grain-drill. A regulating-slide, B, may be used to gage the quantity of grain, and valves are used to stop or allow the flow of the grain. These valves are connected with a bar, so as to be actuated all at once. The valve-bar may be connected suitably with the pivoted or swinging bar to which the hoes are attached, so that by raising the hoes out of the ground the valves are pushed in to stop the grain, and by lowering the hoes the valves are drawn out to let the grain out. The slide B and the valves may be applied to the under side of the bottom of the hopper D. The hoes Y are attached to a pivoted or swinging transverse beam, D', in any suitable manner. I use the holder G for connecting the hoes with the beam D'. The pivots to beam D' may constitute axles to carrying-wheels F. A series of hoes are used in a grain-drill. The hoes may be made in any suitable manner. I have shown a hoe, Y, slotted at the top and having a clasp near the lower end of the slot or within suitable distance of the top of the hoe. The holder G may be made in any suitable manner, and bolted or attached to the beam D'. I show holder G trough-shaped, with holes through the sides to admit pins. These pins are made of wood, but the lower or sustaining-pin may be iron or a bolt. The hoe Y is held in position by the pins passed through the holder G, as shown in Fig. 2. The lower pin sustains hoe Y, the second pin pressing the hoe into the ground, and the upper pin braces the hoe to its place. The upper pin confines the grain conductor or funnel J to its place. When a drill is operating and the hoe comes in contact with an obstacle, the upper and second wood pins will break and allow the hoe to drag back and pass over the obstruction without damage, requiring only replacing of the pins. Funnel J is connected to the bottom of the hopper, and with the upper pin in the holder G. A series of the funnels are used in a grain-drill. At times, when advisable, the second pin in each holder or part of the holders may be taken out to permit the hoe or hoes to adjust to the ground passed over. A lever, K, is applied in any suitable manner to the pivoted or swinging beam D'. By means of lever K the desired pitch is given to the beam D' and the hoes thereto attached. By actuating lever K forward the hoes are let into the ground, and moving the lever backward raises the hoes out of the ground. I show pins confining the lever in its movements. (See Fig. 2 of the drawings.) Other suitable means may be used for holding lever K in its position. If it should be found preferable, the hoes may be raised out of the ground by actuating the lever K sufficiently forward. In this event only a slight variation in the position of some of the parts would be required.

Having thus described my invention, that which I claim as new, and desire to secure by Letters Patent, is, to wit:

1. The stay-pin and holes in the middle longitudinal beam or tongue extension, in combination with lever K, pivoted beam D', grain-drill hoes Y, and grain-drill frame, substantially as shown and described, for the purpose of holding the hoes Y to the inclined position desired.

2. The combination of hoes Y, holders G, pivoted beam D', and grain-drill frame, substantially as shown, for the purpose specified.

3. The combination of wood pins and iron bolts or pins, holders G, and grain-drill hoes Y, for the purpose of securing the hoes Y to the holders G, substantially as specified.

4. The combination of intermediate or second wood pins with the holders G and hoes Y, for the purpose of limiting or confining the hoes Y in their upward movement or tendency when operating in the ground, substantially as specified.

5. The combination of funnels J, holders G, and hoes Y, for the purpose specified.

WORDEN P. PENN.

Witnesses:
BENNIE F. MAPES,
SHADRACK PENN.